USO05674592A

United States Patent [19]
Clark et al.

[11] Patent Number: 5,674,592
[45] Date of Patent: Oct. 7, 1997

[54] FUNCTIONALIZED NANOSTRUCTURED FILMS

[75] Inventors: John C. Clark, White Bear Lake; Mark K. Debe, Stillwater, both of Minn.; Harry E. Johnson, Hudson, Wis.; Danna L. Ross, Pine Springs, Minn.; Robert K. Schultz, Poway, Calif.

[73] Assignee: Minnesota Mining and Manufacturing Company, St. Paul, Minn.

[21] Appl. No.: 434,925

[22] Filed: May 4, 1995

[51] Int. Cl.$^6$ ........................................... B32B 3/00
[52] U.S. Cl. ........................ 428/161; 428/164; 428/172; 428/141; 428/378; 428/380; 427/434.4
[58] Field of Search .................... 428/161, 164, 428/156, 172, 141, 378, 379, 380; 427/534, 407.1, 434.3; 118/402

[56] References Cited

U.S. PATENT DOCUMENTS

| | | | |
|---|---|---|---|
| 4,812,352 | 3/1989 | Debe | 428/142 |
| 4,940,854 | 7/1990 | Debe | 428/411.1 |
| 5,039,561 | 8/1991 | Debe | 427/255.6 |
| 5,139,592 | 8/1992 | Debe | 156/612 |
| 5,176,786 | 1/1993 | Debe | 156/600 |
| 5,238,729 | 8/1993 | Debe | 428/245 |
| 5,326,619 | 7/1994 | Dower et al. | 428/164 |
| 5,336,558 | 8/1994 | Debe | 428/323 |
| 5,338,430 | 8/1994 | Parsonage et al. | 204/412 |
| 5,352,651 | 10/1994 | Debe et al. | 503/227 |
| 5,387,462 | 2/1995 | Debe | 428/245 |
| 5,418,007 | 5/1995 | Debe | 427/154 |
| 5,487,792 | 1/1996 | King et al. | 428/147 |
| 5,549,016 | 8/1996 | Debe et al. | 430/201 |

OTHER PUBLICATIONS

Morra et al., "Surface and Interface Analysis", 16, 412 (1990).
Morra et al., "Langmuir", 5, 872 (1989).
C. D. Bain et al., Angew. Chem. Int. Ed. Engl., 28, 506 (1989).
R.G. Nuzzo et al., Langmuir, 1 45 (1985).
J. Vac. Sci. Tech. 1983, 1(3) 1398–1402.
A. Ulman, "An Introduction to Ultrathin Organic Films, from Langmuir–Blodgett to Self–Assembly", Academic Press, New York, NY (1991) pp. 48–49, 101–103, 237–239, 305–307, and 339–341.

Primary Examiner—Ellis Robinson
Assistant Examiner—Chris S. Kyriakou
Attorney, Agent, or Firm—Gary L. Griswold; Walter n. Kirn; Carolyn V. Peters

[57] ABSTRACT

Low energy surfaces based on nanostructured films exhibit advancing and receding contact angles for liquids such that (1) the difference between the advancing and receding contact angles approaches zero and (2) the advancing and receding contact angles approach 180°. The low energy surface of the present invention comprises a nanostructured film coated with an organized molecular assembly (OMA). Advantageously, the chemical and wetting characteristics of the surface can be altered by changing the functionality of the OMA end groups exposed to the environment in contact with the surface of the nanostructured film.

6 Claims, 6 Drawing Sheets

FUNCTIONALIZED NANOSTRUCTURED FILMS

TECHNICAL FIELD

This invention relates to nanostructured films and more particularly to nanostructured films having low energy surfaces.

BACKGROUND OF THE INVENTION

Contact Angles—When a drop of liquid is placed onto a solid substrate, a definite angle, θ (14) (generally referred to as the "true contact angle"), between the solid-liquid interface (10) and the liquid-vapor interface (12) exists as shown in FIG. 1a (if the angle is 0° then the liquid is said to "wet" the solid). The relationship between θ (14) and interfacial energies (surface tensions) is given by Young's equation, where $\gamma_{LV}$, $\gamma_{SV}$ and $Y_{SL}$ are the interfacial energies of the liquid-vapor (12), solid-vapor (11), solid-liquid interfaces (10), respectively.

$$\gamma_{LV} \cos \theta = \gamma_{SV} - \gamma_{SL} \quad (1)$$

Dynamic and Static Contact Angle Measurements—The measurement of θ can be obtained with many techniques using dynamic or static conditions. The static case is when the solid-liquid-vapor contact line is stationary. The dynamic case is when the solid-liquid-vapor contact line is moving. If the solid-liquid area of contact is increasing (e.g. drop size increasing) the θ value is referred to as the advancing contact angle, $^a\theta$. Conversely if the solid-liquid area of contact is decreasing (e.g. drop size diminishing) the θ value is referred to as the receding contact angle, $^r\theta$. For a smooth, chemically homogeneous, molecularly static surface the value of θ is independent of whether the solid-liquid contact line is moving or stationary. In practice, however, one typically sees a dependence on the measurement technique where $^a\theta$ and $^r\theta$ are different from θ.

Contact Angle Hysteresis—The difference between $^a\theta$ and $^r\theta$ is defined as contact angle hysteresis. Three conditions can be responsible for hysteresis: surface "roughness", chemical inhomogenity of the surface (that is, patches of high and low surface energy) and mobility of the solid surface molecules.

Surface Geometry Effects on Contact Angles—FIGS. 1b and 1c show schematically how the geometry of a surface (22, 23) can affect the macroscopic appearance of a liquid drop on a solid surface (22, 23). Studies with different geometries have shown how roughness, that is the microscopic surface (24, 25) of a surface typically results in $^a\theta$ (28)>θ (30) for an advancing (as depicted by 20) liquid/air interface (depicted as 26) and $^r\theta$ (29)<θ (31) for a receeding (as depicted by 21) liquid/air interface (depicted as 27).

Further, trader certain conditions the liquid drop may rest on a "composite interface" (that is, a combination of solid and air patches). With sufficient "roughness" the surface is, in effect, chemically inhomogeneous, that is, appearing to consist of patches of low energy (air) and higher energy (solid)). The conditions for this situation depend on the surface geometry and θ. A feature often associated with a composite interface is the marked increase in $^r\theta$, such that hysteresis virtually disappears. With a large enough increase in $^r\theta$ a liquid droplet gains the ability to roll around freely on the surface much like liquid mercury on a tabletop.

The ability to control the nature of surfaces to affect contact angles is critical to all processes involving wetting phenomena, such as fluid flow control. However, to date it has not been possible to prepare a surface that demonstrates a minimal hysteresis with both polar and non-polar liquids.

Formation of composite interfaces with fluorochemicals has recently been reported for use in product formulations. This work used plasma etching of poly(tetrafluoroethylene) to produce surface structure. Contact angles from this reference (Morra et al. *Surface and Interface Analysis* 16, 412 (1990) and Morra et al. *Langmuir* 5, 872 (1989)) and other work with different surfaces is given in Table 1 below. These represent the highest $^a\theta$ and $^r\theta$ reported to date.

TABLE 1

| | Contact Angles | |
|---|---|---|
| Surface | Advancing H₂O | Receding H₂O |
| PTFE Oxygen Plasma[1] | 165° | 158° |
| TFE-methanol wax[2] | 159° | 157° |
| TFE-silicone oil[2] | 158° | 157° |
| Paraffin wax[2] | 158° | 153° |
| Paraffin wax[3] | 163° | 122° |

[1] M. Morra et al. Surface and Interface Analysis, 16,412 (1990)
[2] C. D. Bain et al. Angew. Chem. Int. Ed. Engl. 28,506 (1989)
[3] R. G. Nuzzo et al. Langmuir 1, 45 (1985)

SUMMARY OF THE INVENTION

In one aspect of the present invention, low energy surfaces based on nanostructured films exhibit advancing and receding contact angles for liquids such that (1) the difference between the advancing and receding contact angles approaches zero and (2) the advancing and receding contact angles approach 180°. The low energy surface of the present invention comprises a nanostructured film having a plurality of nanostructure elements coated with an organized molecular assembly (OMA). The nanostructure elements have an areal number density of at least $0.1/\mu m^2$, typically in the range of 0.1 to $500/\mu m^2$, preferably in the range of 1 to $50/\mu m^2$. Advantageously, the chemical and wetting characteristics of the surface can be altered by changing the functionality of the OMA end groups exposed to the environment in contact with the surface of the nanostructured film.

The surface also exhibits this property for liquids of lower surface tension, even mineral oil. This makes the surfaces less wettable so that fluids flowing over the surface experience less friction. Liquid repellency of the surface can change sharply from no wetting (rolling drops) to strong capillary wetting with only a small change in liquid surface tension.

Mixed, immisible liquids may be separated on the basis of surface tension by simply flowing them over a surface "tuned" to be wetted by liquids with surface tensions below a certain threshold.

For a given liquid the wetting characteristics of the nanostructured surface can be changed from one extreme to another, that is, from ~180° contact angles to 0° contact angle, simply by changing the functionality of the OMA end groups. Unlike any other surface of which we are aware, the unique surface structure in combination with the surface chemical functionalization of the present invention allows a simple means for controlling its wetting characteristics between different extremes.

Advantageously, the present invention displays higher $^a\theta$ and $^r\theta$ and these increases may be attributed to the differences between conventional rough fluorochemical surfaces and the composite interfaces formed with the functionalized nanostructured surfaces of the present invention. Individual roughness features of the present invention are generally referred to as nanostructure elements. Such differences include discreteness and uniformity of size, shape, orientation and spacing of the nanostructure elements, whereas the surfaces in Table 1 above have roughness that is more irregular and porous like, with much lower aspect ratio of the features.

Some literature suggests surface features below 0.1 μm will not contribute to the formation of composite interfaces. However, referring to FIG. 1(d), the surface of the present invention has nanostructure elements (30) below this lower limit with interwhisker dimensions of <0.05 μm. Much of the repellency in this case may be due to the significantly reduced liquid/solid interfacial area (32). Most of the fluid surface is in contact with air. An empirical relation exists between the contact angle observed on a composite interface (34) and the relative fractions of the two components making up the surface. If one of these components is air then the Cassie-Baxter equation (2) applies, where $f_2$ represents the fraction of the composite interfacial area that is liquid/air and $f_1$ the remaining fraction that is liquid/solid. $\theta_{comp}$ (34) is the contact angle observed on the composite interface and $\theta$ (33) is the contact angle on a smooth homogeneous surface.

$$\cos(\theta_{comp}) = f_1 \cos\theta - f_2 \quad (2)$$

For example, if $\theta_{comp}=171°$ and $\theta=125°$, the solution of equation 2 implies $f_1=2.9\%$.

DESCRIPTION OF THE PREFERRED EMBODIMENT(S)

Figure 1A:
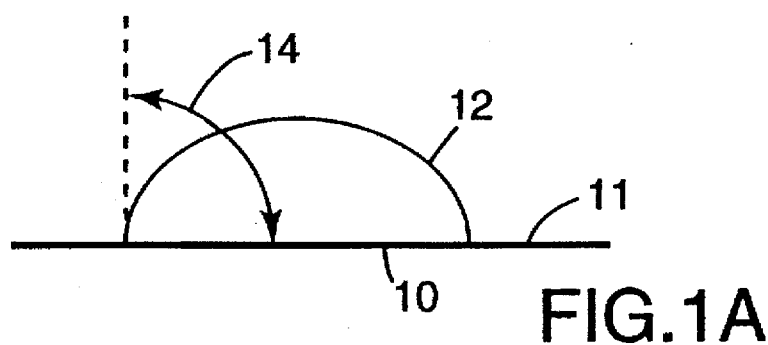
FIGS. 1(a) to (d) are schematic representations of true, advancing and receding contact angles for the model of a liquid drop on (a) an ideally flat surface, (b) a conventionally roughened surface indicating advancing fluid flow, (c) a conventionally roughened surface indicating receding fluid flow and (d) a composite interface.
Figure 1B:
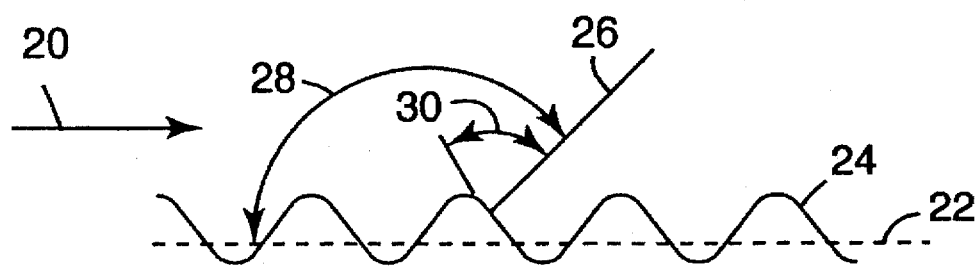
Figure 1C:
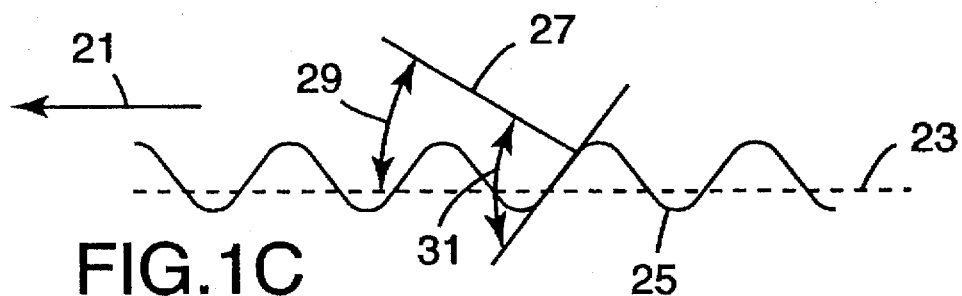
Figure 1D:
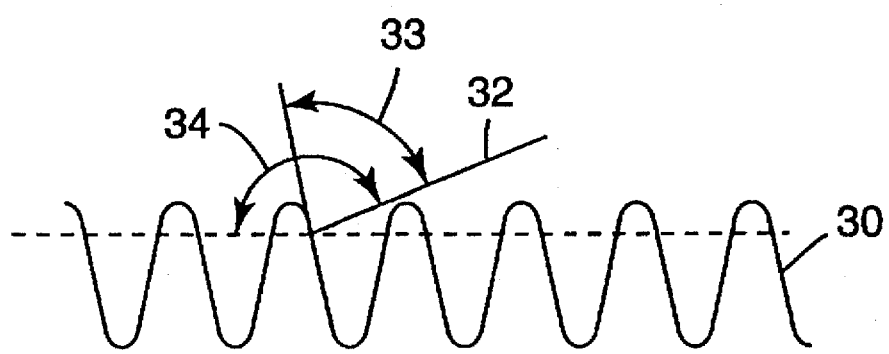

This invention describes uniquely structured surfaces having a wide range of controllable chemical and physical properties, and a process for coating articles with such surface coatings to impart those properties. Surfaces thus coated can exhibit a wide range of utilities, such as liquid repellency, specific chemical reactivity or optimized biochemical immobilization of specific target molecules. For example, co-pending patent application, U.S. Ser. No. 08/434,930, filed May 4, 1995, assigned to the same assignee as the instant application, discloses the use of these surfaces for biomaterial adsorption.

The uniquely structured surfaces of the present invention can exhibit an effective minimal surface energy, that is, extreme repellency to liquids having a wide range of surface tensions. Such surfaces can be used in applications where fluid repellency, liquid separations or fluid control are important. Chemical functionalization of a highly structured surface provides the ability to control its wetting characteristics.

The surface coatings combine aspects of both nanostructured films and organized molecular assemblies. There are two basic steps in the process of forming the article of the present invention. Typically nanostructured films are formed on a substrate first by processing means described below. The process for preparing such films is described in U.S. Pat. Nos. 4,812,352 and 5,039,561 and such description is incorporated herein by reference. The nanostructured film is then further coated to apply an OMA onto the surface of the nanostructure elements. For example, the OMA may be a self-assembled monolayer. By immersing the nanostructured film into an appropriate solution, the nanostructured film is uniformly coated, for example, with a single molecular layer of a functionally-terminated oligomer. Such oligomers are terminated with a moiety capable of bonding to the conformal coating of the nanostructure elements or to the elements, if the elements are single component elements. Other reactive moieties may be present at the other end of these oligomers. For example, the end of an oligomer that bonds with, for example a metal coating (on the nanostructured element) can be a thiol-containing functional group and the other end can be a fluorinated methyl end group. Such coatings produce an extreme hydrophobic and oleophobic surface character. However, it also permissible to use a bonding functionality at one end and an end group at the opposite end that produces a hydrophilic surface.

Nanostructured Films

"Nanostructured" as used in this application means the surface region contains a compositional inhomogeneity with a spatial scale on the order of tens of nanometers in at least one dimension. An example of such a nanostructured surface region with a spatial inhomogeneity in two dimensions is one comprised of elongated metal coated elements (nanostructured elements) uniformly oriented on the surface of the substrate, without touching each other, with sufficient aspect ratio and numbers per unit area to achieve the desired properties. A two-dimensional spatially inhomogenous nanostructured surface region can be one such that translating through the region along any two of three orthogonal directions, at least two different materials will be observed, for example, the nanostructured elements and voids. Such nanostructured materials have been described, for example U.S. Pat. No. 4,812,352 and such description is incorporated herein by reference.

Figure 4:
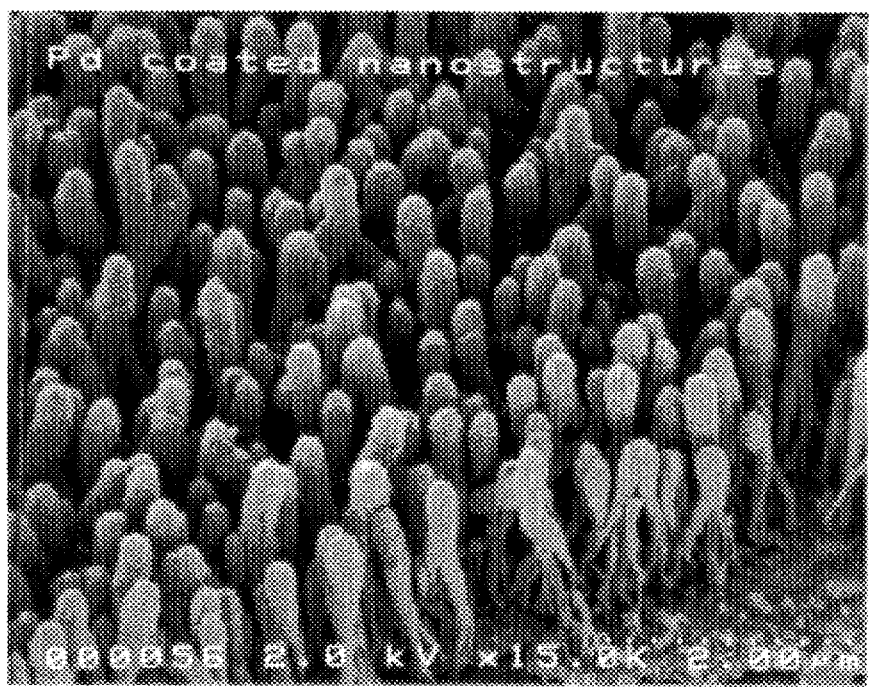
FIG. 4 is a scanning electron micrograph at 15,000× magnification of a fractured edge of a polyimide substrate coated with a nanostructured film consisting of Pd-coated organic pigment whiskers.

Nanostructured films used in this invention comprise a dense distribution of discrete, elongated nanostructured elements, having high aspect ratios (length to width) that are uniformly oriented perpendicular to a substrate. FIG. 4 shows a scanning electron micrograph of one possible nanostructured film.

Other means for generating the nanostructured surface include (1) vacuum deposition of organic pigments onto heated substrates, (2) use of physical vapor transport growth instead of vacuum vapor deposition, (3) vacuum deposition of inorganic materials at high incidence angles, (4) ion or rf sputter etching of polymers, semiconductors or alloys having differential sputtering rates, (5) sputter etching of polymers using microisland masking, (6) photolithography (UV and X-ray), and electron beam lithography, (7) hydrolysis of aluminum to produce boehmite, (8) electrochemical etching of metals and electroplating of roughened metals, (9) photofabrication on photopolymer surfaces, (10) directional solidification and etching of eutectics, and (11) vapor liquid solid (VLS) crystal growth. Any of these methods may be able to produce a nanostructured surface. Several techniques or methods are useful for producing the whisker-like configurations. Methods for making inorganic-, metallic-, or semiconductor-based microstructured-layers or microstructures are described in J. Vac. Sci. Tech. 1983, 1(3), 1398–1402 and U.S. Pat. Nos. 4,812,352, 5,039,561 and 5,238,729.

When made by the process described below and in U.S. Pat. No. 5,039,561, the nanostructure elements have substantially uniform heights, controllable in the range of ~0.1 to 3 µm long, widths of ~0.05 to 0.3 µm, areal number densities on the order of 1–50/µm$^2$, and mean separations of <~0.05 µm, making nanostructured elements that are essentially discrete and noncontacting.

The nanostructure elements used in the present invention are composites comprising an organic pigment core, conformally coated with a second material, for example, a thin metal or metal alloy sheath, although they could be a single material, for example a metal or metal alloy. The nanostructured elements and methods for preparing them on a substrate are described in U.S. Pat. Nos. 4,812,352 and 5,039, 561.

Briefly, an organic pigment, for example N,N'-di(3,5,-xylyl)perylene-3,4:9,10-bis(dicarboximide) (PR149), is vacuum vapor-deposited onto a substrate, then annealed in vacuum for ½–1 hour at ~200° C.–260° C. This causes the film to undergo a solid state transition, converting the film to a crystalline, fibril or whiskered state. The initial PR149 film thickness is generally <200 nm, but the nanostructured elements (whiskers or fibrils) can be over 2 µm tall. These whiskers can be further coated with metals, metal alloys, and other inorganic materials, such as metal oxides by various vacuum coating means. The preferred conformal coating of the whisker cores in these nanostructured elements is a metal, such as Au, Pt, Ag, Cu and Pd. The use of a metal conformal coating enables formation of a bond between the metal coating and monolayer oligomers.

Organized Molecular Assemblies

"Organized molecular assemblies" as used in this invention comprise appropriate molecules assembled as a layer with some degree of orientational or translational order onto suitable substrates so as to present a substantially homogeneous chemical functionality to the environment in contact with the layer's surface.

Examples of organized molecular assemblies include Langmuir-Blodgett films, self-assembled monolayers, and organic layers having a molecularly ordered surface. Langmuir-Blodgett films, self-assembled monolayers, methods for making them, suitable substrate materials and appropriate organized molecular assembly molecules have been extensively discussed in the literature, see, for example, A. Ulman, *An Introduction to Ultrathin Organic Films, from Langmuir-Blodgett to Self-Assembly*, Academic Press, New York, N.Y. 1991). Examples of thin organic layers having molecularly ordered surfaces can include water and oil repellent coatings, such as Scotchgard™ protective chemicals available from 3M.

Organized molecular assemblies that form self-assembled monolayers at a liquid-solid interface are particularly useful and have generated much interest in recent years. It is well documented that simply immersing gold surfaces in solutions of long chain alkyl-thiol molecules results in a strong sulfur-gold bond, causing the alkyl portion of the molecule chain to orient away from the surface. (Bain et al. *Angew. Chem. Int. Ed. Engl.* 28, 506 (1989) and Nuzzo *Langmuir* 1, 45 (1985)) The adsorbed layer is closely packed, one molecular layer thick and presents the tails of the molecules to the environment. Suitable substrates include, for example metals, metal alloys, metal oxides, such as $SiO_2$, $Al_2O_3$, $TiO_2$, $SnV_2$, GaAs and the like. The characteristics of an interface can be dramatically altered with the deposition of such a film by virtue of the chemical functionality of the end groups of the self-assembled molecules. Generally, literature reports monolayer formation only on smooth metallized substrates. The present invention describes a highly structured (nanostructured) surface coated with an OMA to form composite interfaces that behaves as a smooth substrate would as though it had a significantly lower intrinsic surface energy. Advantageously, surfaces of the present invention have liquid repellency for liquids having surface tensions greater than about 30 mN/m.

Synergistic Hydrophobicity of the Composite Coating

The formation of a monolayer on the nanostructured elements by self-assembly is achieved simply by immersion. For the articles described below, sheets of the nanostructured films grown on polyimide substrates were immersed in a 0.1 mmol solution of octadecyl mercaptan ($C_8H_{37}SH$) or a fluorocarbon-hydrocarbon thiol ($C_8F_{17}(CH_2)_{11}SH$) in ethanol. After several hours to 24 hours, samples were rinsed with ethanol for 1 minute and blown dry with nitrogen. This method was found to work routinely with no complications.

Figure 3:
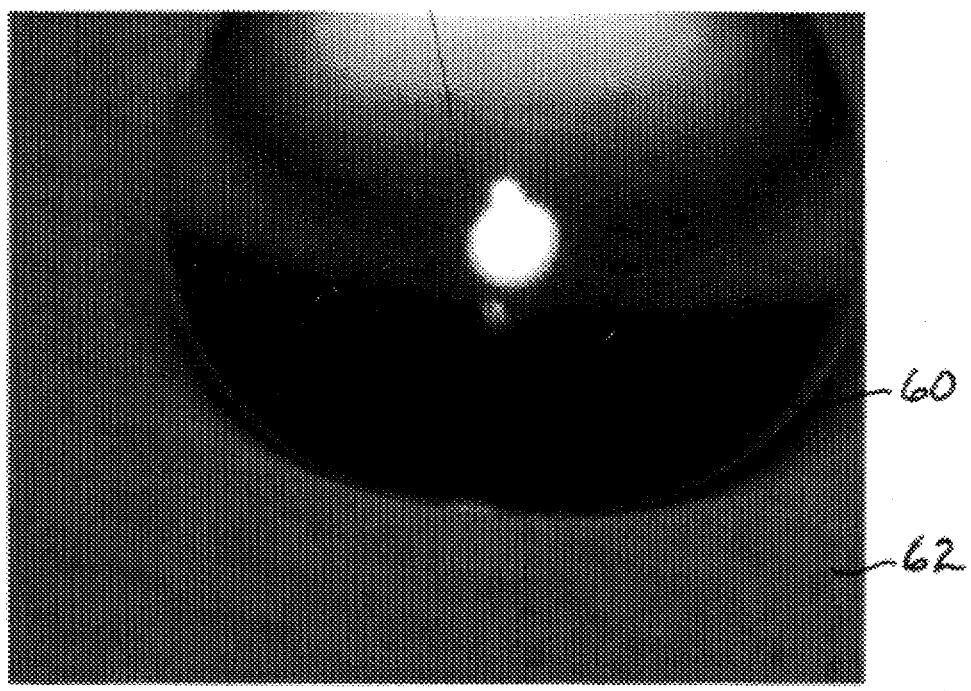
FIG. 3 is an optical micrograph of a 2 mm diameter water droplet sitting on a $C_8F_{17}(CH_2)_{11}SH$ functionalized, Pd-coated nanostructured surface with measured advancing and receding contact angles of 171° each.

Once the substrates were coated with the monolayers, contact angle (θ) measurements for five liquids of varying surface tension were used to characterize the substrates and verify that the surface properties had been strongly affected (see Examples 1–24). The unique wetting properties of the nanostructure-plus-monolayer surface were much greater than either component alone could produce, and so effective that water droplets, and in some cases even mineral oil, would "float" on the surface as near perfect spheres at room temperature. This effect is illustrated in FIG. 3, an optical micrograph of a 2 mm diameter water droplet sitting on the $C_8F_{17}(CH_2)_{11}SH$ functionalized, Pd-coated nanostructured surface with measured advancing and receding contact angles of 171° each. Droplets roll freely around the surface at the slightest inclination of the substrate. Droplets could also be "chased" or "pulled" around simply by bringing an electrostatically charged object (for example, plastic pen cap) in proximity (1–2 cm) to the droplets but without touching them.

Figure 2A:
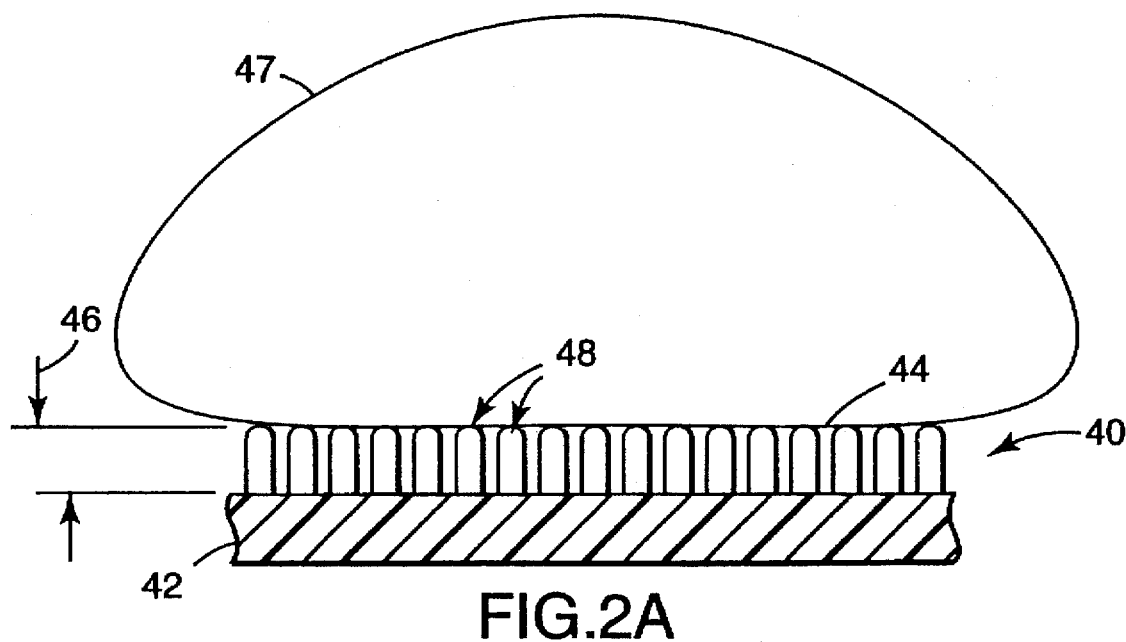
FIGS. 2(a) to (b) are schematic models of the liquid/air/nanostructured interface with a organized molecular assembly molecule conformally coating one of the nanostructure elements.
Figure 2B:
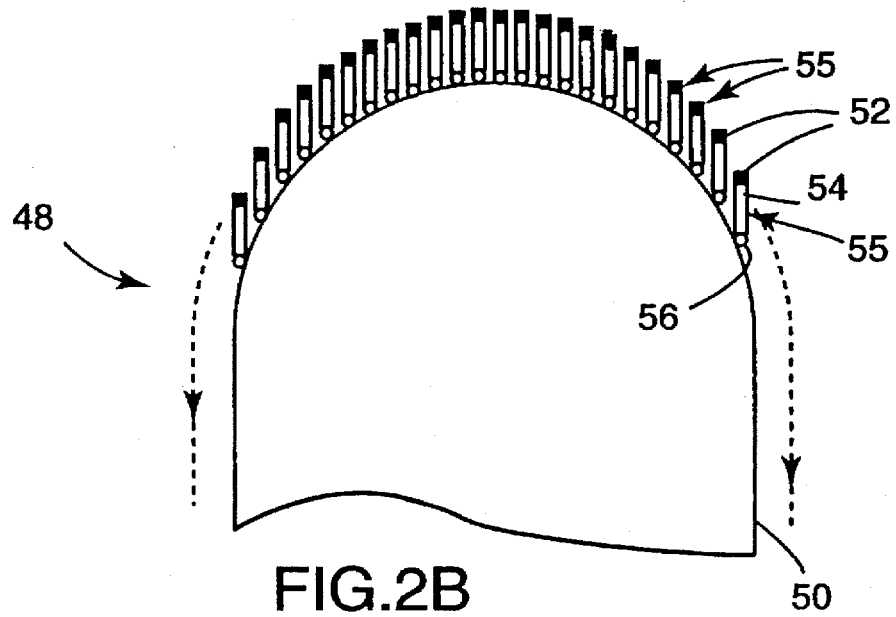

FIGS. 2(a) and (b) show a schematic of a nanostructured film (40) according to the present invention comprising a plurality of nanostructure elements (48) on a substrate (42), wherein the nanostructure elements (48) are conformally coated with a molecular layer (55), supporting the water droplet (47) of FIG. 3. Enlarging a nanostructured element (48), it becomes apparent that the molecular layer (55) can comprise organized molecular assembly molecules having, for example three relatively distinct portions, a tail end (56) that bonds to the surface of the nanostructure whisker (50), the other tail end (52) that provides homogeneous chemical functionality, and a middle portion (54) connecting both ends. FIGS. 2(a) and 2(b) are merely illustrative of the present invention and are not to scale.

Only a few percent of solid surface is in contact with the liquid. For example, assuming the tips of every element are in contact with the water droplet bottom, since every tip has a radius of ~50 nm and there are ~10/$\mu m^2$, the solid surface in contact with the droplet bottom is a maximum of 10% of the planar area. The remainder of the liquid surface is in contact with air.

The low energy surfaces of the present invention exhibit advancing and receding contact angles for water that are both more equal to each other and closer to 180° than any previously reported to our knowledge. They also display this property for liquids of lower surface tension, even mineral oil. This makes the surfaces nonwettable with lower friction for fluid flow over these surfaces. The liquid repellency can also change very sharply from no wetting (rolling drops) to strong capillary wetting over a small range of liquid surface tension (see FIG. 5). This may offer the potential for discriminating or separating mixed liquids on the basis of surface tension by simply flowing them over the invented surface "tuned" to be wetted by liquids with surface tensions below a certain threshold.

For a given liquid, such as water, the wetting characteristics of the nanostructured surface can be changed from one extreme to the other, from ~180° contact angles to 0° contact angle, simply by changing the exposed chemical functionality of the surface of the OMA-coated nanostructure elements. Unlike any other surface, the unique whiskered structure in combination with the surface functionalization allows a simple means for controlling its wetting characteristics between two very different extremes.

Because of the unique surfaces of the present invention, these films are particularly useful in articles wherein fluid control would be either essential or advantageous. These surfaces may be patterned or unpatterned. A patterned surface could include for example, regions of hydrophobicity and regions of hydrophilicity. Such utilities would include but are not limited to aerosol delivery devices, such as spray paint can nozzles, ink jet nozzles, crop sprayers, commercial paint sprayers, thermal condensation surfaces, anti-soiling surfaces, anti-biofouling surfaces, non-icing surfaces, liquid separation surfaces, low drag surfaces, piping surfaces (both inside and outside), nondew forming surfaces, and other devices, such as medical devices like catheters and syringes.

Objects and advantages of this invention are further illustrated by the following examples, but the particular materials and amounts thereof recited in these examples, as well as other conditions and details, should not be construed to unduly limit this invention. All materials are commercially available or known to those skilled in the art unless otherwise stated or apparent.

EXAMPLES

In Examples 1-25, contact angle measurements of liquids with varying surface tension applied to various nanostructured and structureless surfaces, with and without alkylthio monolayers were compared.

Contact angle measurements were made using a commercial apparatus (Rame'—Hart Contact Angle Goniometer, Model 100) by expressing an approximately 1 microliter droplet out of a hypodermic syringe and carefully raising the sample surface to just contact the droplet while still suspended from the syringe. This is defined as the "equilibrium contact angle". The droplet is then enlarged or shrunk while measuring the contact angle to obtain the advancing and receding contact angles respectively.

Examples 26-27 demonstrate the use of the present invention for separating liquids and as ice-free surfaces. The liquids, ranging from water to n-octane, were chosen to give a range of surface tensions from 72.5 to 21.8 mN/m.

General Preparation Procedure for a Nanostructured Surface

In the examples below, a nanostructured surface was generated using a three step process. First, the organic pigment C.I. Pigment Red 149, (N,N'-di(3,5,-xylyl) perylene-3,4:9,10-bis(dicarboximide)) (commercially available from Hoechst-Celanese) was vacuum-vapor deposited to a thickness of approximately 0.15 $\mu m$ onto 0.13 mm thick metallized polyimide film at a pressure of $<2\times10^{-4}$ Pa. Secondly, the PR149-coated polyimide was vacuum annealed at 200°-220° C. for periods of ½ hour to 1 hour. The vacuum was not critical and varied as high as ~5 Pa. The annealing process caused the original smooth PR149 film to undergo recrystallization to form a layer of discrete, oriented crystalline whiskers. Each whisker had approximately 0.05× 0.03 $\mu m$ crossections, lengths in the range of 0.1 to ~5 $\mu m$, and areal number densities in the range of 0.1 to 50/$\mu m^2$. Thirdly, the nanostructured layer was vacuum-coated with metal, such as Pd, Pt, Ag or Au, by evaporation, sputtering or other such process, coating each individual whisker with a conformal sheath of metal. The geometric surface area of the whiskers is 10-15 times the planar area of the substrate, so the deposited planar-equivalent metal thickness is typically 10-15 times larger than the conformal coating thickness surrounding each nanostructured whisker (nanostructure element).

Self-Assembled Monolayers

For preparing self assembled monolayers, octadecyl mercaptan, $C_8H_{37}SH$, was used (available from Aldrich Chemical Co.). The fluorinated molecule, $C_8F_{17}(CH_2)_{11}SH$, was prepared using the following synthetic route: perfluorooctyl iodide was reacted with undecylenic alcohol using benzoyl peroxide as an initiator. This iodide adduct was then reduced with lithium aluminum hydride to give $C_8F_{17}(CH_2)_{11}OH$. Hydrogen bromide gas was then bubbled through the reaction mixture at an elevated temperature to convert the alcohol to the bromide. The bromide was then converted to the mercaptan via the Bunte salt reaction.

Examples 1 and 2

Examples 1 and 2 show that higher water contact angles were measured from articles of the present invention than those reported in the literature as summarized above in Table 1. Furthermore, Example 1 demonstrates that the advancing and receding contact angles for water are equal.

Example 1

A PR149 nanostructured film was grown on a 15 cm×30 cm piece of Ag-coated polyimide substrate and the whiskers were vapor-coated with a mass equivalent thickness of 200 nm of Pd. Using scanning electron microscopy, the resultant nanostructure elements were determined to be 1.5 $\mu m$ tall, with ~250 nm diameter crowns and areal number densities of 7.5/$\mu m^2$. The nanostructure-coated polyimide was immersed in 0.1 mmol solution of $C_8F_{17}(CH_2)_{11}SH$ in ethanol for 24 hours, then rinsed with ethanol for 1 minute and blown dry with nitrogen. As shown in Table 2, the advancing and receding contact angles for water were both found to equal 171°. Because of the very high values of both the advancing and receding contact angles, a drop of water rolled or slipped around on the monolayer covered whiskers much like a drop of mercury on a tabletop.

FIG. 3 shows a 2 mm diameter water droplet on this surface. The slightest inclination of the substrate caused the droplet to race to the edge. By bringing a plastic pen cap, electrostatically charged by rubbing it against hair or fabric, within 1–2 cm, the water droplet could be pulled or pushed around the surface. When the plastic pen cap was brought within <1 cm, the water droplet leapt off the surface and attached itself thereto.

Example 2

The same nanostructured surface as prepared in Example 1 was coated with a monolayer of $C_8H_{37}SH$. The advancing and receding contact angles of water on this surface were measured to be 169° and 153°, respectively.

Comparative Examples 3–6

Comparative Examples 3 to 6 show that the high contact angles for water measured on the self-assembled monolayer-treated nanostructured films are a consequence of the synergistic effects of combining a monolayer with a nanostructured film. Using the nanostructured film without the monolayer or the monolayer coated on a smooth metal film without any structure results in much smaller contact angle.

Comparative Example 3

$C_8F_{17}(CH_2)_{11}SH$ was adsorbed on a polished Si-wafer, which had previously been sputter coated with 150 nm of Au. The advancing and receding contact angles were measured to be 125° and 105°, respectively (Table 2).

Comparative Example 4

$C_{18}H_{37}SH$ was adsorbed on a polished Si wafer, which had previously been sputter coated with 150 nm of Au. The advancing and receding contact angles were measured to be 111° and 85° respectively (Table 2).

Comparative Example 5

A nanostructured surface with Pd-coated whiskers as prepared according to Example 1, but without an adsorbed monolayer, was observed to have an initial advancing contact angle of 90°. However, the value decreased smoothly down to roughly 10° over a time period of one minute. The decrease was not due to spreading of the drop but rather to capillarity effects causing the liquid to "wick" into the metal coated whiskers. Therefore, the results were independent of whether the metal coating was gold or palladium.

Comparative Example 6

A smooth, gold-coated Si wafer without either a OMA or a nanostructured layer was observed to have advancing and receding contact angles of 38° and 8°, respectively (Table 2).

TABLE 2

| Ex | Surface | Contact Angles (accurate to ±1°) | |
|----|---------|------------------|------------------|
| | | Advancing $H_2O$ | Receding $H_2O$ |
| 1 | $C_8F_{17}(CH_2)_{11}SH$/Nanostructure | 171° | 171° |
| 2 | $C_{18}H_{37}SH$/Nanostructure | 169° | 153° |
| 3 | $C_8F_{17}(CH_2)_{11}SH$/Smooth gold | 125° | 105° |
| 4 | $C_{18}H_{37}SH$/Smooth gold | 111° | 85° |
| 5 | Gold-coated nanostructure only | 90°* | wicks in |
| 6 | Smooth gold | 38° | 8° |

*Initial contact angle. After ~ 1 minute, water drop wicks into nanostructure due to capillarity.

Comparing Example 1 with Comparative Example 3, it was observed that for the smooth surface, exposing perfluoroalkyl segments to the air interface, $^a\theta=125°$ and $^r\theta=105°$. Upon treating the whisker substrate with the $C_8F_{17}(CH_2)_{11}SH$ molecules, a pronounced repellency of water was seen as well, $^a\theta=171°$ and $^r\theta=171°$. The substrate was very repellent to water and no hysteresis was noted.

Comparing Example 2 with Comparative Example 4, it was observed that a monolayer of octadecyl mercaptan on a smooth gold substrate results in the creation of a hydrophobic surface. The advancing contact angle for water is increased to 111° while the receding angle is now 85°. When the whisker substrate is used the advancing angle increases approximately 60° to $^a\theta=169°$. Note here that the receding contact angle is also increased by roughly 70° to $^r\theta=153°$.

Example 7

PR149 was vapor deposited as described in Example 1 onto a Ag coated sheet of polyimide substrate, 30 cm×120 cm in size, and annealed in $5\times10^{-5}$ Pa for 105 minutes at a maximum temperature of 220° C. The resulting PR149 whisker phase was electron beam evaporation coated with Pd to a mass equivalent thickness of 200 nm to produce a nanostructured film consisting of oriented elements with heights ranging from 1 to 3 µm tall, and mean tip diameters of 0.20 µm. Counting only the taller nanostructure peaks in normal incidence SEM photos at 30,000×, there appeared to be 3 nanostructure elements per square micrometer. A monolayer of $C_8F_{17}(CH_2)_{11}SH$ was coated onto the nanostructure elements as described above in Example 1.

Figure 5:
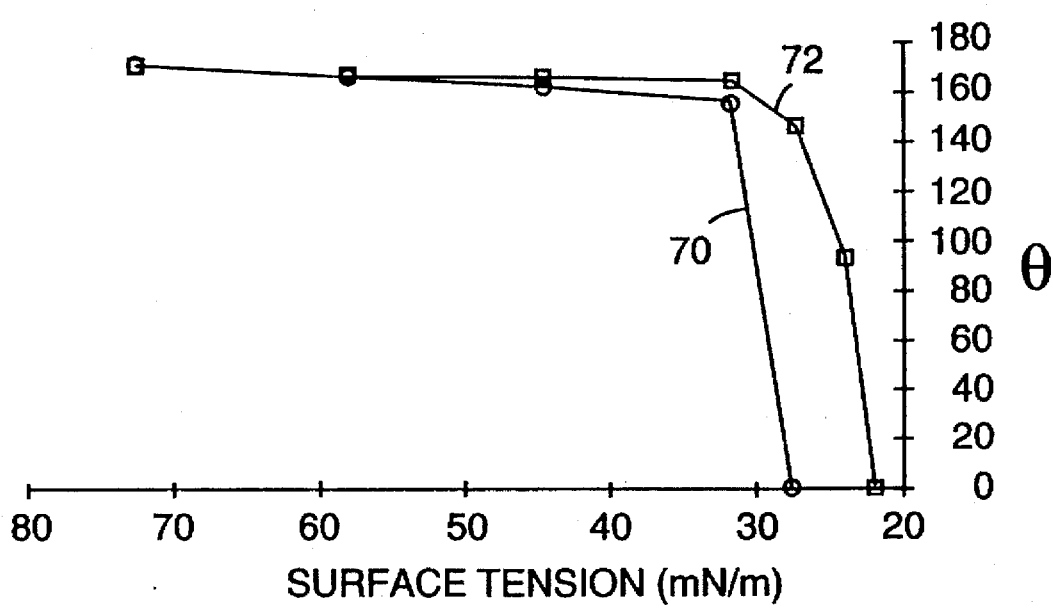
FIG. 5 is a plot of receding and advancing contact angles as a function of surface tension for five different liquids as described in Example 7.

The advancing and receding contact angles were measured for seven liquids of differing surface tension, including water, formamide, 1-bromonapthalene, mineral oil, hexadecane, n-decane and n-octane. Table 3 summarizes the equilibrium, advancing and receding contact angles and the mean standard deviation. FIG. 5 is a plot of the advancing and receding contact angles as a function of surface tension of the liquid (depicted by 72 and 70, respectively) to show that wetting (defined as when $^r\theta$ goes to zero) does not occur even for liquids having surface tensions as low as that of mineral oil. For example, a spherical drop of mineral oil was observed to roll freely on the surface. The advancing contact angle for hexadecane remains high but the receding contact angle drops to zero. N-octane wicks into the nanostructure surface. When wetting does occur, the transition is a sharp function of surface tension as shown in FIG. 5.

TABLE 3

Contact Angles

| Ex | Liquid | Surface Tension mN/m | Equilibrium | Advancing | Receding |
|---|---|---|---|---|---|
| 1 | Water | 72.5 | 178 ± 0.6° | 170 ± 0.6° | 171 ± 0.4° |
| 2 | Formamide | 58.2 | 177 ± 0.3° | 165 ± 0.2° | 166 ± 0.3° |
| 3 | 1-Bromonaphthalene | 44.6 | 173 ± 2.3° | 166 ± 0.2° | 162 ± 0.2° |
| 4 | Mineral Oil | 31.5 | 163 ± 2.1° | 163 ± 0.5° | 156 ± 0.5° |
| 5 | Hexadecane | 27.3 | 149 ± 1.2° | 146 ± 0.8° | 0° |
| 6 | n-decane | 23.9 | | 93° | 0° |
| 7 | n-octane | 21.8 | | wicks in | wicks in |

Example 8

Figure 6:
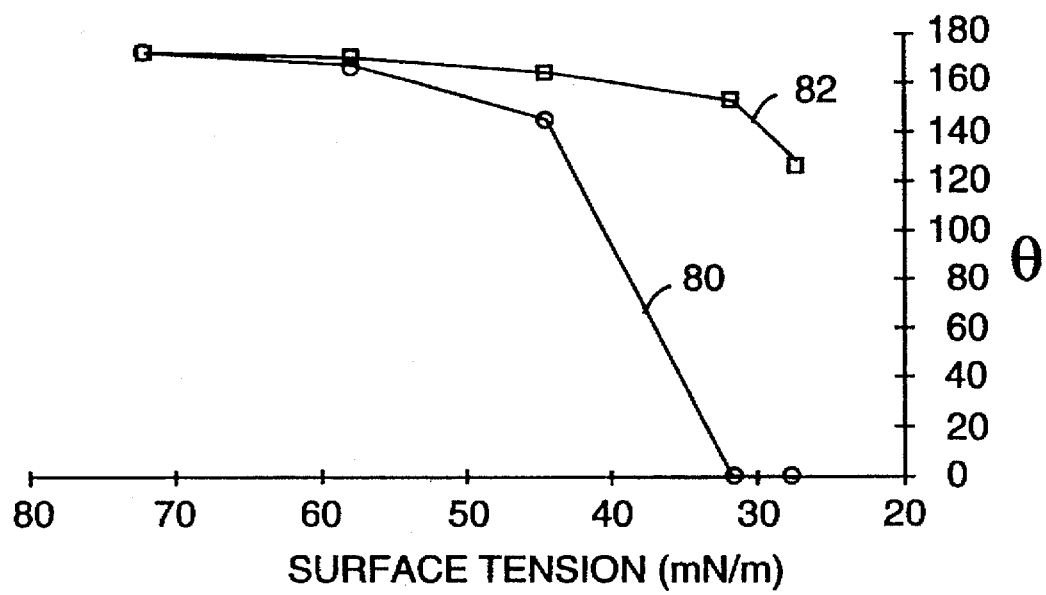
FIG. 6 is a plot of receding and advancing contact angles as a function of surface tension for five different liquids as described in Example 8.

A nanostructured surface was prepared in a similar manner as described in Example 7, but annealed at ~0.6 Pa at a maximum temperature of 220° C. for 45 minutes and then vapor-coated with 60 nm mass equivalent planar thickness of Pd. The resulting nanostructure elements were ~1.3 μm tall with tip diameters of 0.13 μm. The heights appeared to be more uniform than the examples in Example 7, and the areal number density was counted to be approximately 77 whiskers/9 μm² (8.5/μm²). The surface was functionalized with $C_8F_{17}(CH_2)_{11}SH$ as in previous examples and the contact angles for five liquids of varying surface tension measured. FIG. 6 compares the advancing and receding contact angles (depicted by 82 and 80, respectively).

It is believed the differences illustrated in FIG. 5 as compared to FIG. 6 results from the lower areal number density of the nanostructured elements of Example 7 as compared to the areal number density of the nanostructured elements of Example 8. The lower the areal number density of nanostructured elements, the greater is the proportion of the liquid-air interface to liquid-solid interface, and Equation 2 implies a higher composite contact angle should result.

Examples 9-24

In Examples 9-24, the effect of varying physical characteristics of the nanostructure elements is investigated. The primary structural characteristics that may affect surface wetting properties are nanostructure element lengths, tip diameters, spacings (or areal number densities), and uniformity of size and orientation. Examples 7 and 8 illustrated the strong effect of whisker spacing or more generally length distribution, but this is not easily varied in a systematic way. Two principal quantities that were systematically varied were the whisker lengths and the amount of metal deposited conformally around the whiskers, which affected both tip diameters and tip spacings.

Examples 9-14

In Examples 9-14, the effect on measured contact angles of varying nanostructure element lengths, while maintaining tip diameters and spacings approximately the same (to within a factor of about two) is shown. PR149 was vapor deposited as described in Example 1, but the annealing times and temperatures were varied to obtain whiskers with differing heights. Pd was vapor-coated over the samples in varying amounts to give whisker tip diameters in the range of 0.13 to 0.23 μm. The numbers per unit area varied from a low of ~6/μm² to ~20/μm². A monolayer of $C_8F_{17}(CH_2)_{11}SH$ was coated onto the nanostructures as described above.

The equilibrium, advancing, and receding contact angles for water are summarized in Table 4 along with the estimated nanostructure element heights and crown diameters as measured from SEM micrographs. It appears that above approximately 0.5 μm, there is no dependence of wettabilty on length. The contact angles for formamide, 1-bromonaphthalene, mineral oil and hexadecane were also measured for these surfaces and showed a similar behavior, in that the advancing and equilibrium contact angles were independent of whisker length, above about 0.7 μm. A conclusive correlation could not be established between the whisker length and the receding contact angles for these liquids.

TABLE 4

Effect of nanostructure lengths on contact angle

| | Length | Water Contact Angles | | |
|---|---|---|---|---|
| Ex | (μm) | Equilibrium | Advancing | Receding |
| 9 | <0.1* | 156 ± 1.9° | 153 ± 0.7° | 91 ± 0.3° |
| 10 | 0.7 | 178 ± 0.3° | 173 ± 0.2° | 172 ± 0.3° |
| 11 | 1.25 | 178 ± 0.3° | 172 ± 0.3° | 172 ± 0.2° |
| 12 | 1.8 | 178 ± 0.6° | 171 ± 0.3° | 171 ± 0.2° |
| 13 | 2.0 | 178 ± 0.3° | 173 ± 0.3° | 172 ± 0.2° |
| 14 | 2.5 | 178 ± 0.6° | 172 ± 0.4° | 173 ± 0.3° |

*Slightly bumpy Pd film coated on barely converted PR149 film.

Examples 15-24

In Examples 15-24, the effect on measured contact angles of varying Pd metal thickness coated onto the nanostructured whiskers is shown. The number of such nanostructure elements per unit area varied as in the previous examples, ~6-20/μm², and the whisker lengths vary in the range of 1 to 2.5 μm, but, as illustrated in Examples 9-14, this was not a significant variable. PR149 was vapor-deposited as described in Example 1 onto a single sheet of Ag-coated polyimide, 30 cm wide by 120 cm long, which was then cut into four 30 cm×30 cm pieces. Three of the pieces were annealed, under 0.6 Pa, at maximum temperatures of 220° C. (for one piece) and 220° C. for the other two pieces, for periods of 1 and ½ hour respectively. Pd was then vapor-coated over the samples through a mask such that a different thickness of Pd was coated onto each 15 cm×15 cm quadrant of each sample sheet. The mass equivalent thickness' varied over the range of 16 nm to 340 nm of Pd. Because the whiskers presented an effective geometric surface area increase of 10-15 over the planar area of the substrate, dividing the mass equivalent thickness of Pd by a factor of 10 to 15 gave an estimate of the thickness of Pd metal actually conformally coated on the nanostructure elements. A monolayer of $C_8F_{17}(CH_2)_{11}SH$ was coated onto the nanostructures as described above.

The water advancing and receding contact angles are summarized in Table 5 along with the estimated nanostructure element heights measured from SEM micrographs, and the mass equivalent thickness of Pd-coated per unit area of sample. Reviewing the results in Table 5 for water, it appears the contact angles were not sensitive to the amount of Pd coated onto the nanostructure whiskers over the range investigated. This was considered not unusual, provided there was sufficient Pd to give a continuous conformal coating around the whisker elements, but not so much that they were fused together.

Contact angles for the sample surfaces in Examples 15-24 were also measured with the four other liquids, as described in Example 14 above. The results showed no significant dependence on metal coating thickness, and hence tip diameter and whisker spacing over the range investigated, and a dependence on surface tension similar to that shown in FIG. 6.

TABLE 5

| Ex | Pd Thickness (nm) | H$_2$O Equilibrium | Contact Angles Advancing | Receding |
|---|---|---|---|---|
| 15 | 16 | 161 ± 1.2° | 172 ± 0.4° | 171 ± 0.4° |
| 16 | 25 | 177 ± 0.6° | 171 ± 0.4° | 170 ± 0.3° |
| 17 | 32.5 | 177 ± 0.3° | 170 ± 0.4° | 170 ± 0.4° |
| 18 | 40 | 177 ± 0.3° | 171 ± 0.4° | 171 ± 0.2° |
| 19 | 60 | 177 ± 0.6° | 171 ± 0.3° | 171 ± 0.2° |
| 20 | 70 | 178 ± 0.6° | 170 ± 0.4° | 171 ± 0.3° |
| 21 | 80 | 179 ± 0.3° | 171 ± 0.3° | 171 ± 0.3° |
| 22 | 90 | 179 ± 0.3° | 172 ± 0.3° | 172 ± 0.2° |
| 23* | 100 | 178 ± 0.6° | 172 ± 0.4° | 173 ± 0.3° |
| 24 | 340 | 178 ± 0.3° | 173 ± 0.3° | 172 ± 0.2° |

*Example 23 is the same as Example 14

Examples 25–26

Examples 25 and 26 demonstrate use of this invention for liquid-liquid separations and as a surface coming to which ice will not adhere.

Example 25

The nanostructured coating of this invention was applied to an 8 cm diameter disc of 50 μm thick polyimide stretched inside a stainless steel ring. The whiskers were gold coated and functionalized with $C_8F_{17}(CH_2)_{11}SH$. 1 mL of cyclohexane was added to 2 mL of distilled water and the mixture shaken vigorously to disperse the cyclohexane phase as tiny droplets throughout the water phase. The mixture was quickly poured onto the sample surface and allowed to flow around. The cyclohexane immediately wetted into the nanostructured film wherever fluid contacted the surface. After sloshing for 10–15 seconds, the remaining liquid was poured off into a container and the cyclohexane allowed to evaporate from the surface. After two more applications to the whisker surface, the remaining liquid appeared to be pure water with no smell of cyclohexane.

Example 26

The nanostructured coating of this invention was applied to an 8 cm diameter disc of 50 μm thick polyimide stretched inside a stainless steel ring. The whiskers were gold coated (150 nm mass equivalent) and functionalized with $C_8F_{17}(CH_2)_{11}SH$. The sample was held above a boiling flask of water with the structured surface facing down so as to bathe the invented surface with steam. Liquid nitrogen was poured onto the back of the polyimide substrate, confined by the stainless steel ring, to drastically cool the nanostructured film facing the steam. After approximately 1 minute a layer of frost had formed on the surface. When the LN$_2$ had fully evaporated the sample was removed from the vapor, held vertically and observed. Immediately the frost layer shrunk into fragments and fell off the surface.

Example 27

Example 27 shows that the nanostructured surface can be functionalized to make it extremely hydrophilic.

Example 27

The nanostructured coating of this invention was applied to an 8 cm diameter disc of 50 μm thick polyimide stretched inside a stainless steel ring. The whiskers were gold coated (150 nm mass equivalent). The nanostructures were coated with a self assembled monolayer of acidic terminated molecules, by immersing in a 1 mM solution of 3-mercaptopropionic acid, $HSCH_2CH_2COOH$ in ethanol. In stark contrast to the fluorocarbon functionalized surfaces, water wicked into the nanostructured film and spread along the surface. When a 10 mL droplet of water was applied to the surface, it instantly wicked into the nanostructured and formed a wet spot 8 mm across.

Comparative Examples 28–30

Comparative Examples 28–30 demonstrate that without the OMA of a self-assembled monolayer, the hysteresis is larger and the contact angles are lower for a full range of liquid surface tensions as summarized in Table 6.

Comparative Example 28

A nanostructured film was prepared on a polyimide substrate by first vapor coating 70 nm of Pd on the polyimide, then 250 nm of PR149 which was annealed at 264° C. to grow the whiskers. There were 4–5 nanostructure elements/square micrometer. An 8 cm diameter piece of the film was stretch mounted between two stainless steel rings with the nanostructured side up. FC905, an acrylic copolymer of 65% MeFOSEA (perfluoro-actyl sulfonamido ethyl acrylate) and 35% ODMA (octadecyl methacrylate) available from 3M Co. was dried down to solid and redissolved in toluene. The higher molecular weight material was precipitated from the toluene solution by addition of methanol. The precipitate was redissolved in toluene for coating the nanostructures. 3 mL of 0.75 mg/mL toluene solution of the FC905 precipitate was applied to the film surface and the toluene allowed to evaporate. Ultra-high resolution scanning electron micrographs show the nanostructure elements appear to have a thin, translucent conformal coating, estimated to be a few nanometers thick. Table 6 shows the resulting measured advancing and receding contact angles for different liquids.

Comparative Example 29

A nanostructured surface prepared as in Comparative Example 28 was coated with a thicker layer of FC905 by applying 3 mL of 5.67 mg/mL solution in toluene and allowing the toluene to evaporate. The coating still appeared as a thin translucent conformal coating around the Au coated whiskers. The receding and advancing contact angles are as shown in Table 6.

Comparative Example 30

A very thick layer of the FC905 was applied to the nanostructured surface prepared identically to that in Comparative Examples 28 and 29. The SEM micrographs clearly show the FC905 polymer around the nanostructure elements and partially filling the interstices between them. The receding and advancing contact angles are shown in Table 6.

TABLE 6

| Liquid | Surface Tension mN/m | Comparative Example 28 | | Comparative Example 29 | | Comparative Example 30 | |
|---|---|---|---|---|---|---|---|
| | | $^a\theta$ | $^r\theta$ | $^a\theta$ | $^r\theta$ | $^a\theta$ | $^r\theta$ |
| Water | 72.5 | 165° | 164° | 178° | 178° | 178° | 178° |
| Forma- | 58.2 | 135° | 0° | 160° | ~0° | 163° | 123° |

TABLE 6-continued

| Liquid | Surface Tension mN/m | Comparative Example 28 $^a\theta$ | Comparative Example 28 $^r\theta$ | Comparative Example 29 $^a\theta$ | Comparative Example 29 $^r\theta$ | Comparative Example 30 $^a\theta$ | Comparative Example 30 $^r\theta$ |
|---|---|---|---|---|---|---|---|
| mide | | | | | | | |
| 1-Bromine | 44.6 | <~10° | 0° | 145° | 0° | 146° | 0° |
| Mineral Oil | 31.5 | 0° | 0° | 120° | 0° | 100° | 0° |
| Hexadecane | 27.3 | 0° | 0° | 108° | 0° | 97° | 0° |
| n-Decane | 23.9 | 0° | 0° | 0° | 0° | 68° | 0° |
| n-Octane | 21.8 | 0° | 0° | 0° | 0° | 38° | 0° |

Examples 1–27 show that surface repellency properties can be greatly affected with the introduction of surface structure on the size scale described here as nanostructured. Repellency of water and other liquids is seen to be greatly enhanced by fluorocarbon functionalization with an OMA of a structured film having the spatial and geometric physical characteristics of the nanostructured whiskers. Besides their size scale and packing densities, the uniformity of their dimensions and orientation perpendicular to the surface so that they are discrete and substantially noncontacting are considered important characteristics. Based on the nominal performance of the sample in Example 7, whisker-to-whisker spacings and the length distribution of the nanostructure elements appeared to be relevant parameters. With a monolayer fluorocarbon coating on the whiskers, spherical water beads and even mineral oil beads were mobile on the substrate due to the unique composite interface of this invention.

Example 31

Example 31 demonstrates the ability to apply the coating of the present invention to the inside surface of 80 μm diameter orifices in the nozzle plate of a commercial ink jet printer.

Example 31

The orifice plate was removed from an ink jet printer ink cartridge assembly (Hewlett Packard model HP 51650). The orifice plate was a gold-coated metal plate 12 mm×3 mm×85 μm thick. It contained two parallel rows, spaced 0.67 mm apart, of tapered holes down the center of its length. The tapered holes had an internal (ink well side) orifice diameter of 80 μm and an external (air side) orifice diameter of 40 μm.

An ~100 nm layer of PR149 was vacuum deposited onto the large diameter side of the orifice plate. The plate was then vacuum annealed in $10^{-2}$ Pa for sufficient time to produce nanostructured PR149 whiskers. The whiskers were then coated with Au to a mass equivalent thickness of 150 nm, and a monolayer of $C_8F_{17}(CH_2)_{11}SH$ applied to the nanostructure elements as described in Example 1. SEM characterization of the orifices showed the nanostructured film was fully coated on the insides of the tapered holes. The surface of the orifice plate was observed via SEM to have a nanostructured surface equivalent to those observed in Examples 1–27. A droplet of the pigment ink of the type used in the cartridge was placed on the nanostructured film sample used in Example 24 and was observed to roll freely. Because of the similarlity of nanostructure coating on the orifice interior and the sample used in Example 24 it was concluded the orifice interior would demonstrate a high degree of repellency to the pigment ink.

Examples 32–38

Examples 32–38 show that coating the present invention onto the inside surfaces of aerosol drug delivery devices reduces the undesirable effect of drug retention by those surfaces.

For all tests, the actuator devices used were solution actuators (available from Southern Plastic Mold, Inc., Anaheim, Calif. and used in AutoInhaler™ model M3708 commerically available from 3M). Drug formulations, 0.45% pirbuterol acetate (commercially available from Pfizer) in hydrofluoroalkane (commercially available from DuPont as "P134a") propellant, were prepared by weighing pirbuterol acetate into a 4 oz glass aerosol vial, adding 5 mL of glass beads (Technical Quality Glass Spheres, Potters Industries, Inc., Brownwood, Tex.), and crimping a continuous valve onto the vial. Propellant 134a was added using a pressure burette. Pirbuterol acetate was dispersed in the propellant by placing the glass vial in a paint shaker for 5 minutes. The vial was chilled in dry ice and the formulation was transferred to a standard 15 mL aluminum aerosol vial, which was then crimped with a metered dose valve.

Medication delivery was determined using a modified USP medication delivery apparatus (ARSIII) designed to capture all drug delivered past the mouthpiece. The metered dose inhaler (MDI) was actuated into an exhaust hood 10 times through a separate M3708 actuator (100, 200 in FIGS. 7 and 8) immediately prior to testing to prime the valve stem. The MDI was shaken and then actuated once into a medication delivery apparatus (ARSIII) attached to a vacuum source, which provided air flow at 12 L/min. The apparatus (ARSIII) was rinsed with methanol and diluted to volume in a volumetric flask. The actuator was rinsed with methanol into a separate volumetric flask and diluted to volume. At least fifteen single shots were collected individually from each of the different actuators in a randomized fashion. Samples (of delivered drug) were assayed by UV spectroscopy at 295 nm. All actuator example configurations were also rinsed with methanol and assayed by UV spectroscopy at 295 nm to assure that there was no UV interference prior to medication delivery testing. The parameter which was monitored throughout the tests was the percent drug retention, which is defined as:

% drug retention=(μg drug in actuator)/(total drug recovered)

where, total drug recovered=μg drug in actuator+μg drug in ARSIII.

Figure 7:
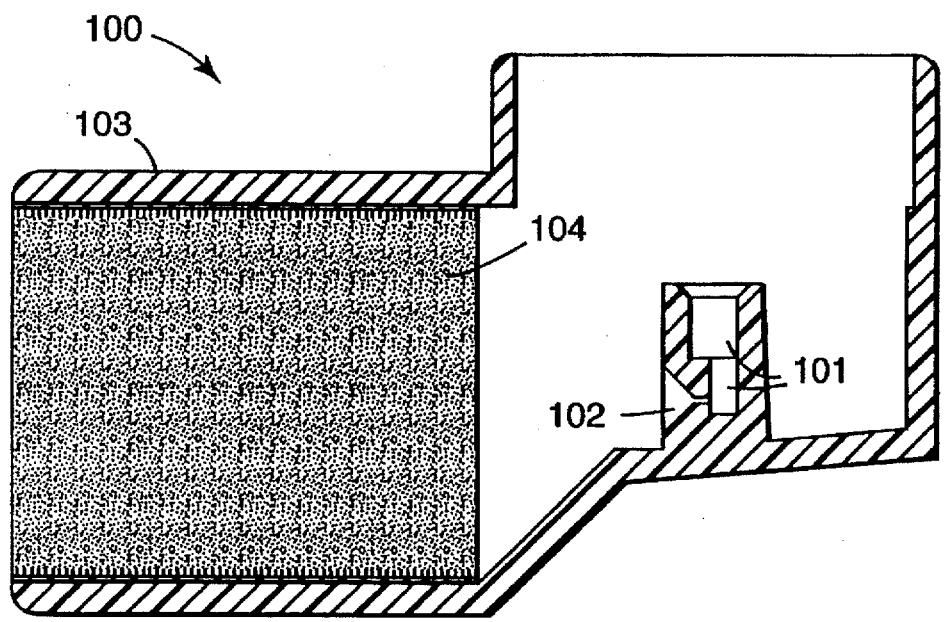
FIG. 7 is a cross-sectional view of a metered dose inhaler having a nanostructured film in the mouth piece tube portion of the inhaler.
Figure 8:
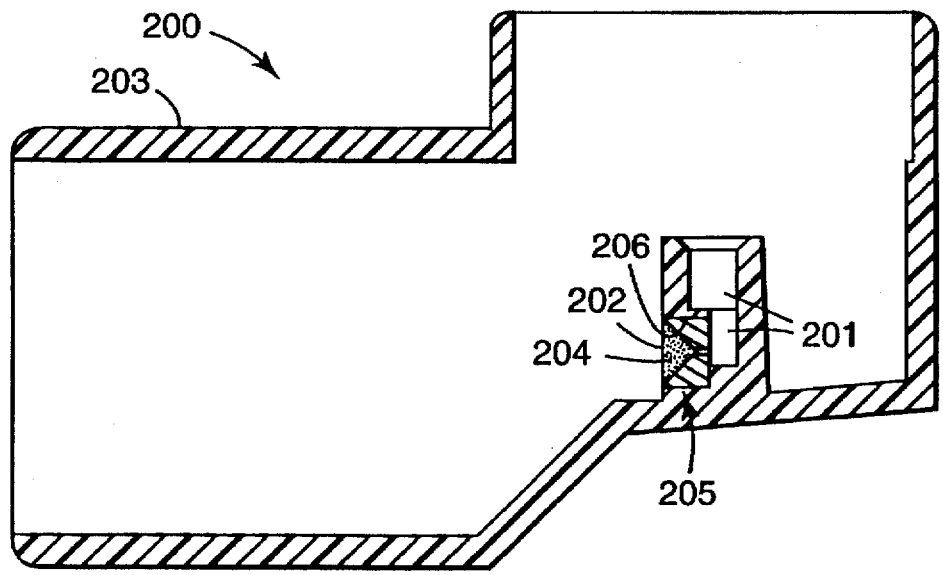
FIG. 8 is a cross-sectional view of a metered dose inhaler having a nanostructured film on the surface of the nozzle portion of the inhaler.

It is believed that drug hold-up can occur within the valve stem (not shown), valve stem socket (101, 201) in FIGS. 7 and 8 the actuator nozzle (102, 205) and the inside surface (104) of the mouth piece tube (103, 203).

Examples 32–35 demonstrate that drug retention is reduced when the nanostructured film of present invention is applied to the inside surface (104) of the mouth piece tube (103).

Figure 9:
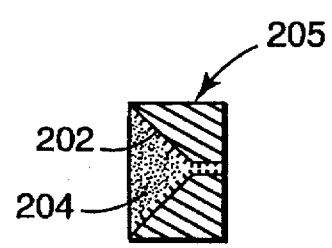
FIG. 9 is a cross-sectional view of a replacement insert nozzle coated with a nanostructured film.

Examples 36–38 show that drug retention is further significantly reduced when the film of the present invention (204) is applied to the actuator nozzle (205) in FIGS. 8 and 9.

Example 32

A nanostructured film of the present invention, a 30 cm by 120 cm sheet of Ag-coated polyimide was prepared as described in Example 1, except the whiskers were vacuum coated with 150 nm mass equivalent thickness of Au. The coated whiskers were then coated with a monolayer also as described in Example 1. SEM showed the resulting nanostructure elements were 1.5–2 μm tall with tops ~0.13 μm in diameter. A rectangular strip, 6.51 cm×2.62 cm, was cut from the larger sample piece, rolled into a cylinder and placed inside the actuator (100) mouth piece tube (103) with the hydrophobic surface (104) facing the interior of the tube (103), as shown in FIG. 7. The % drug retention was measured with this actuator using the above protocol, with the results summarized in Table 7.

Example 33

A second sample of the present invention was prepared similarly to Example 32 except the PR149 was deposited onto a Au-coated polyimide. SEM showed the nanostructure elements were ~1 μm tall and 0.2 μm in diameter at their tops. A rectangular strip, 6.51 cm×2.62 cm was cut from the larger sample piece, rolled into a cylinder and placed inside the actuator (100) mouth piece tube (103) with the hydrophobic surface (104) facing the interior of the tube (103). The % drug retention was measured with this actuator using the above protocol, the result are summarized in Table 7.

Comparative Examples 34-35

As a first comparative example, a rectangular piece of Cu-coated polyimide, having no other surface treatment, was rolled into a cylinder and placed inside the actuator (100) mouth piece tube (103) with the Cu-surface facing the tube interior.

As a second comparative example, an as-received actuator tube with no other coating or lining of the mouth piece tube was tested using the above protocol, and the results are summarized in Table 7.

Comparative Examples 36-37

As-received actuator model M3208, were modified by drilling to enlarge the nozzle (206 in FIG. 8) to a diameter of 4.00 mm and depth of 2.54 mm. Replacement stainless steel insert nozzles (205 in FIG. 9), were fabricated to allow a press fit into the modified actuator tube (200). The orifice of the replacement nozzles had the same dimensions as the original actuator (100). The conical surface (202) of the insert (205) was polished smooth.

Comparative Example 36 was an unmodified actuator. Comparative Example 37 was a modified actuator having an uncoated stainless steel insert nozzle.

Example 38

For Example 38, the nanostructured film of the present invention were prepared as described in Example 33, to the conical section (202) of the stainless steel insert nozzle (205) prior to its insertion into the modified actuator (200).

TABLE 7

| Example | % Retention |
| --- | --- |
| 32 | 29.7 ± 2.8 |
| 33 | 28.4 ± 3.5 |
| 34 | 35.6 ± 2.9 |
| 35 | 34.0 ± 3.3 |
| 36 | 34.6 ± 2.0 |
| 37 | 30.8 ± 4.5 |
| 38 | 23.3 ± 2.3 |

Summary

In summary, coating the present invention on the inside surface of the mouth piece tube (Examples 32-33 and Comparative Examples 34-35) reduced the amount of total drug retention by approximately 16.5%.

All three samples (Examples 36-38) were tested as described above. The results summarized in Table 7 show the stainless steel nozzle, which had been coated with the present invention resulted in a 33% reduction in actuator drug retention compared to the unmodified, standard actuator, and a 24% reduction compared to the actuator with the uncoated stainless steel nozzle.

Various modifications and alterations of this invention will become apparent to those skilled in the art without departing from the scope and principles of this invention, and it should be understood that this invention is not to be unduly limited to the illustrative embodiments set forth hereinabove. All publications and patents are incorporated herein by reference to the same extent as if each individual publication or patent was specifically and individually indicated to be incorporated by reference.

What is claimed:

1. A low energy surface composite comprising A nanostructured film comprising a plurality of discrete, elongated nanostructure elements of a first material conformally coated with a second material layer of molecules that form an organized molecular assembly creating a surface of a substantially homogeneous chemical functionality and wherein the nanostructure elements have an areal number density of 0.1 to 500/μm$^2$.

2. The nanostructured film according to claim 1 wherein the organized molecular assembly is a self-assembled monolayer.

3. The nanostructured film according to claim 1 wherein the nanostructure elements have an aspect ratio greater than 3.

4. A low energy surface composite comprising A nanostructured film having a surface which when brought in contact with a liquid has an advancing and a receding contact angle for the liquid such that the contact angle hysteresis approaches zero, wherein the nanostructured film comprises a plurality of discrete, elongated nanostructure elements of a first material conformally coated with a second material layer of molecules of an organized molecular assembly creating a surface of a substantially homogeneous chemical functionality and wherein the nanostructure elements have an areal number density of 0.1 to 500/μm$^2$.

5. The nanostructured film according to claim 4 wherein the organized molecular assembly is a self-assembled monolayer.

6. The nanostructured film according to claim 5 wherein the nanostructure elements have an aspect ratio greater than 3.

* * * * *